US008162101B2

(12) United States Patent
Ono

(10) Patent No.: US 8,162,101 B2
(45) Date of Patent: Apr. 24, 2012

(54) RAM INTAKE UNIT HAVING A SOUND ABSORBING STRUCTURE

(75) Inventor: Takahiro Ono, Kobe (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 42 days.

(21) Appl. No.: 12/556,067

(22) Filed: Sep. 9, 2009

(65) Prior Publication Data

US 2010/0071991 A1 Mar. 25, 2010

(30) Foreign Application Priority Data

Sep. 19, 2008 (JP) ................................ 2008-241240
Sep. 19, 2008 (JP) ................................ 2008-241241

(51) Int. Cl.

| | |
|---|---|
| ***F02M 35/00*** | (2006.01) |
| ***F02M 35/02*** | (2006.01) |
| ***F02M 35/10*** | (2006.01) |
| ***F02K 1/08*** | (2006.01) |
| ***F02B 77/04*** | (2006.01) |
| ***F01N 13/08*** | (2010.01) |
| ***B62D 61/02*** | (2006.01) |

(52) U.S. Cl. ............... 181/229; 123/184.61; 123/198 E; 180/219; 181/204; 181/219; 181/227

(58) Field of Classification Search .................. 181/229, 181/227, 219

See application file for complete search history.

(56) References Cited

U.S. PATENT DOCUMENTS 4,010,812 A * 3/1977 Bothwell ...................... 180/227
4,188,924 A * 2/1980 Kirchweger et al. ...... 123/41.65
5,124,600 A * 6/1992 Hedeen ........................... 310/51
6,178,939 B1 * 1/2001 Powell ..................... 123/184.21
6,209,502 B1 * 4/2001 Davis et al. .............. 123/184.46
6,520,284 B2 * 2/2003 Spannbauer et al. ......... 181/214
6,863,038 B2 * 3/2005 Yamauchi .................. 123/90.18
2001/0011448 A1 * 8/2001 Kino et al. ................... 55/385.3
2003/0140882 A1 * 7/2003 Lundgreen et al. ...... 123/184.31
2004/0050357 A1 * 3/2004 Idei et al. .................. 123/198 E
2005/0150703 A1 * 7/2005 Nakagome et al. ........... 180/219
2005/0284692 A1 * 12/2005 McWilliam et al. .......... 181/258
2006/0151225 A1 * 7/2006 Tsujii et al. .................... 180/209
2007/0000467 A1 * 1/2007 Shaw et al. .............. 123/184.53
2007/0256882 A1 * 11/2007 Bedard et al. ................. 180/312
2008/0230307 A1 * 9/2008 Matsumoto et al. .......... 181/229
2009/0050391 A1 * 2/2009 Nobuhira ...................... 180/219
2009/0293832 A1 * 12/2009 Matsumoto et al. ..... 123/184.61
2009/0321169 A1 * 12/2009 Bedard et al. ................. 180/210

FOREIGN PATENT DOCUMENTS

JP 2003343373 A * 12/2003

OTHER PUBLICATIONS

Wikipedia, The free Encyclopedia, Wikimedia Foundation, Inc., http://en.wikipedia.org/wiki/Foam#Solid_foams.*

* cited by examiner

*Primary Examiner* — Elvin G Enad
*Assistant Examiner* — Christina Russell

(57) ABSTRACT

A ram intake unit mounted on a front portion of a frame structure of a motorcycle includes an acoustic material disposed along an inner wall of a ram air intake duct for absorbing induction noises, which duct forms an induction system through which an incoming wind can be introduced towards a motorcycle combustion engine, and a holder disposed inwardly of the acoustic material for securing the acoustic material to the ram air intake duct.

16 Claims, 10 Drawing Sheets

RAM INTAKE UNIT HAVING A SOUND ABSORBING STRUCTURE

CROSS REFERENCE TO THE RELATED APPLICATION

This application is based on and claims Convention priority to Japanese patent applications No. 2008-241240 and No. 2008-241241, both filed Sep. 19, 2008, the entire disclosure of each of which is herein incorporated by reference as a part of this application.

BACKGROUND OF THE INVENTION

1. Field of the Invention

The present invention relates to a ram intake unit employed in a front portion of a motorcycle.

2. Description of the Related Art

In a motorcycle of a kind equipped with a so-called ram induction system, in which an air intake opening for introducing towards a combustion engine an air eventually forming an air-fuel mixture with a fuel, is mounted in a front region of a motorcycle frame structure, an external air is supplied through the air intake opening at the front portion of the motorcycle frame structure to the combustion engine by way of a ram air intake duct and an air cleaner during the travel of the motorcycle. In some of the motorcycles now in use, an acoustic material or a sound absorbing material is applied to inside of the ram air intake duct by means of an adhesive agent such as, for example, one or more lengths of double-sided adhesive tape in order to suppress induction noises then generated in the air intake system.

It has, however, been found that the use of the only adhesive agent to secure the acoustic material often results in removal of the acoustic material from the ram air intake duct by the effect of the incoming wind, which blows during the travel of the motorcycle relatively in a direction opposite to the direction of travel of the motorcycle.

SUMMARY OF THE INVENTION

In view of the foregoing, the present invention has been devised to substantially eliminate the above discussed problems and inconveniences and has for its primary object to provide a ram intake unit in which the acoustic material will not drop out from the ram air intake duct even when exposed to the strong incoming wind.

In order to accomplish the foregoing objects of the present invention, the present invention provides a ram air intake unit for a motorcycle that is mounted on a front region of a motorcycle frame structure, which unit includes an acoustic material disposed along an inner wall of a ram air intake duct, which forms an air intake passage leading to a motorcycle combustion engine, for absorbing induction noises and a holder for securing the acoustic material to the ram air intake duct.

According to the present invention, the acoustic material is retained by the ram air intake duct by means of the holder and, accordingly, even when it is exposed to the strong incoming wind during the travel of the motorcycle, the acoustic material will not drop out and as a result, the sound absorbing effect afforded by the acoustic material can be enjoyed for a prolonged period of time. Also, if the conventional adhesive agent is concurrently employed, the possible removal of the acoustic material from the ram air intake duct can be more effectively avoided.

The holder referred to above is preferably of a netted configuration. The net allows the incoming wind to contact portions of the acoustic material, which are exposed through meshes of such net to the incoming wind, and therefore, a relatively high sound absorbing effect can be maintained.

In a preferred embodiment of the present invention, the ram intake unit may include a stay for supporting a side viewing mirror and a bracket for supporting a gauge unit, and the ram air intake duct, the stay and the bracket are preferably integrally molded of a synthetic resin. This is particularly advantageous in that since the ram air intake duct for introducing an air therethrough, the stay for supporting the side viewing mirror and the bracket for supporting the gauge are formed integrally, the number of component parts used can be reduced to thereby reduce the number of assembling steps. Also, since the use is made of the synthetic resin to reduce the weight and the entirety is molded integrally, the rigidity of the entirety can be increased to secure a required strength, and the increase of the rigidity can contribute to prevention of sound transmission in a flat surface area to thereby increase a sound absorbing effect.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

Figure 1:
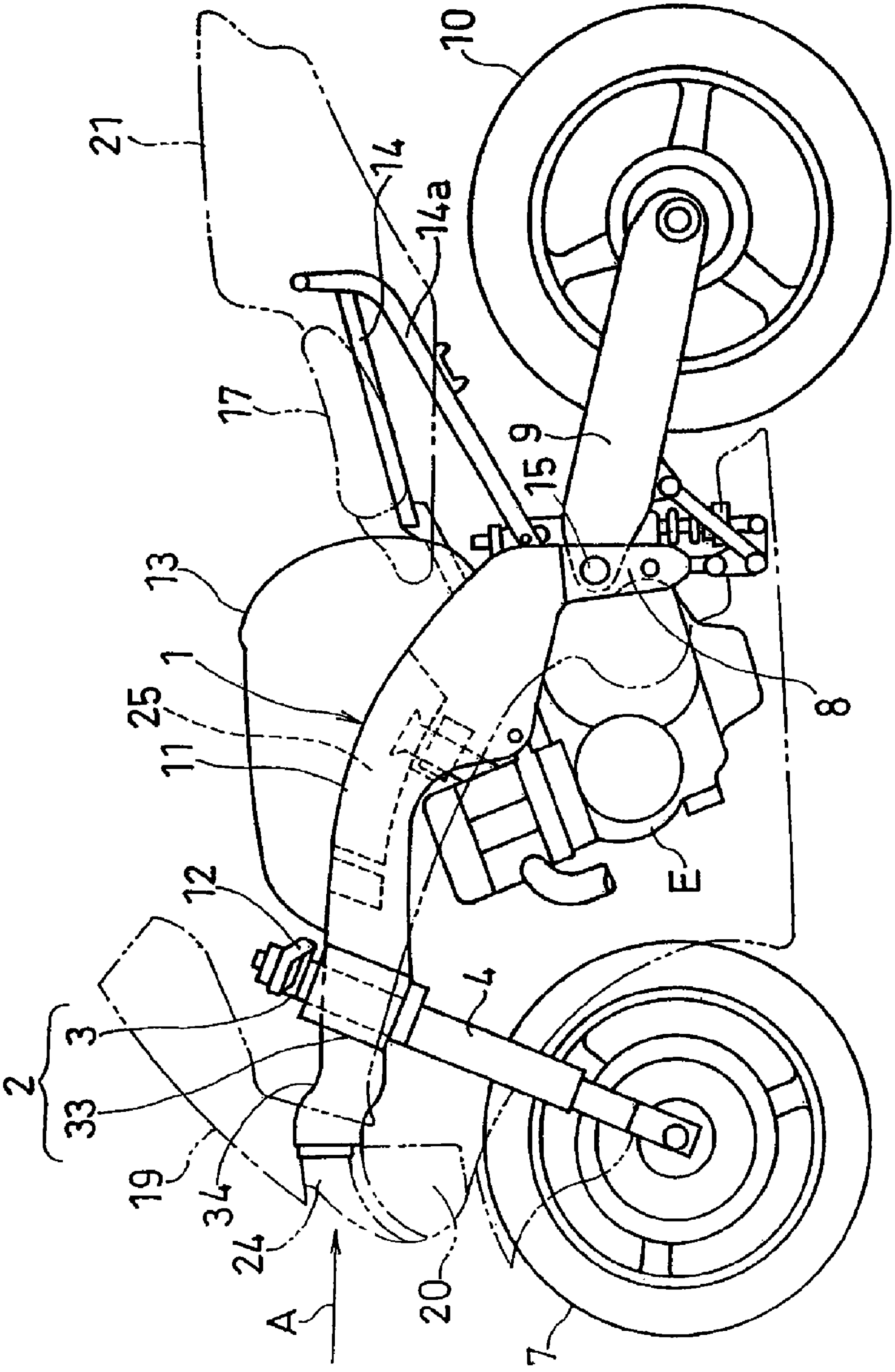
FIG. 1 is a schematic side view of a motorcycle equipped with a ram intake unit according to a preferred embodiment of the present invention.

The following reference numerals denote the following legends.

E: Combustion engine
1: Motorcycle frame structure
20: Headlamp assembly
34: Ram intake unit
36: Ram air intake duct
37*b*: Front engaging member
37*c*: Rear engaging member
38: Side viewing mirror
40: Stay
40*a*: Mirror mounting surface
42: Gauge unit
44: Bracket
44*a*: Gauge mounting surface
46: Headlamp support piece
48: Resonator chamber
50: Acoustic material
53: Rib
60: Holder
62*b*: Front engagement area
62*c*: Rear engagement area
69: Hook
70: Recess

DESCRIPTION OF THE PREFERRED EMBODIMENTS

A preferred embodiment of the present invention will be described in detail with reference to the accompanying drawings. Of those accompanying drawings, FIG. 1 schematically illustrates a side view of a motorcycle equipped with a ram intake unit according to the preferred embodiment of the present invention.

Referring to FIG. 1, the motorcycle shown therein includes a motorcycle frame structure 1 having a main frame 11 and a head block 2 at a front portion of the main frame 11. This head block 2 includes a head tube 3 formed integrally therewith, and a front fork assembly 4 is rotatably supported by the head tube 3 through a steering shaft (not shown), with a front wheel 7 rotatably supported at a lower end thereof for rotation in any manner known to those skilled in the art.

A swingarm bracket 8 is secured to a lower intermediate portion of the motorcycle frame structure 1, and a swingarm 9 is pivotably supported by the swingarm bracket 8 through a pivot pin 15 at a front end thereof for movement up and down. The swingarm 9 in turn supports a rear wheel 10 rotatably in any manner known to those skilled in the art. A combustion engine E forming a motorcycle power plant is mounted in a generally lower intermediate portion of the motorcycle frame structure 1 and is drivingly coupled with a rear wheel 10 for driving the latter through a drive transmission chain (not shown). A handlebar 12 is rigidly mounted on respective upper end portions of the steering shaft and the front fork assembly 4 for steering movement so that the motorcycle can be maneuvered. A fuel tank 13 is mounted on the main frame 11.

Left and right seat rails 14 and corresponding reinforcement rails 14*a* are provided in a rear portion of the main frame 11 of the motorcycle frame structure 1, and a seat assembly made up of a rider's seat 17 and a fellow passenger's seat 21 is mounted on the seat rails 14. A fairing 19 made of a synthetic resin is fixedly mounted on the front portion of the motorcycle frame structure 1 so as to cover a space ranging from a region forwardly of the handlebar 12 to lateral regions on left and right sides of that front portion of a motorcycle body.

Figure 2:
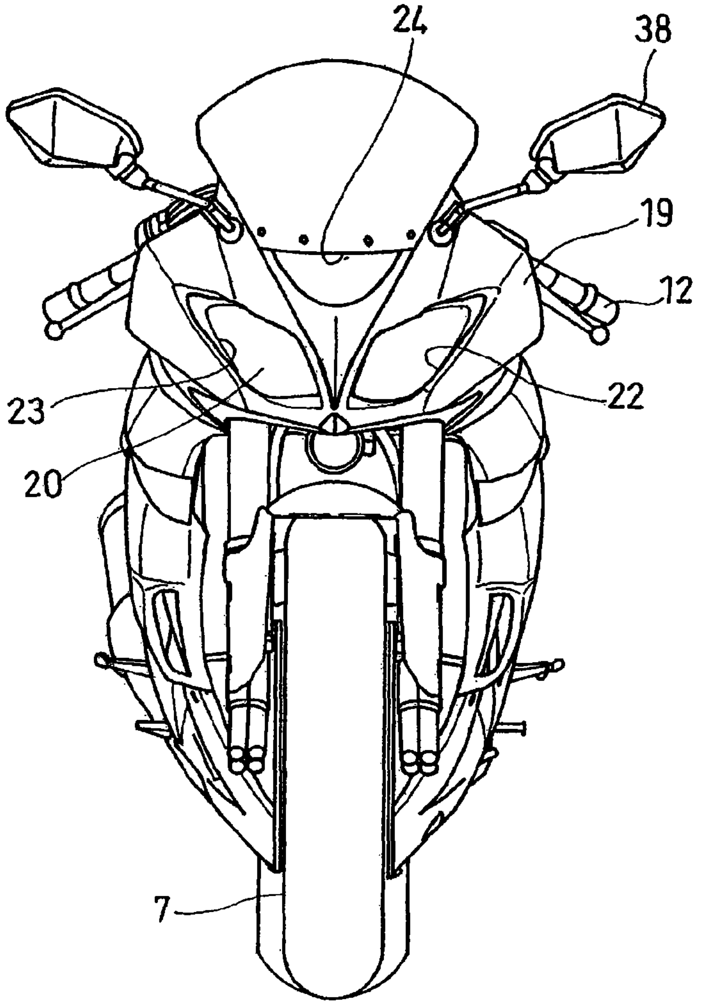
FIG. 2 is a schematic front elevational view of the motorcycle shown in FIG. 1.

Referring now to FIG. 2, which illustrates a schematic front elevational view of the motorcycle shown in FIG. 1, the fairing 19 has various openings defined therein. Those openings in the fairing 19 include left and right headlamp apertures 22 and 23 for accommodating left and right headlamp units forming respective parts of a headlamp assembly 20 and an air intake opening 24 defined in the fairing at a location intermediate between and above the headlamp apertures 22 and 23 for introducing towards the combustion engine E, an air which eventually forms an air-fuel mixture in admixture with a fuel. Left and right side viewing mirrors 38 are mounted on respective portions of the fairing 19 on left and right sides of the air intake opening 24, respectively.

Figure 3:
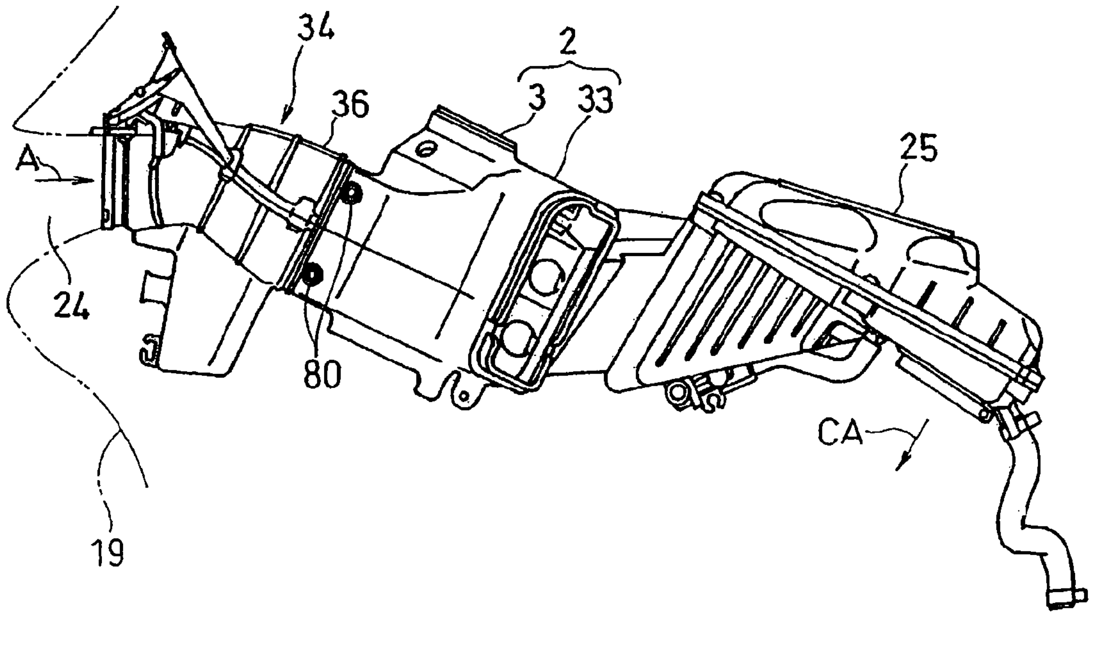
FIG. 3 is a side view showing the ram intake unit and its peripheral component parts.

As shown in FIG. 3, the head block 2 referred to above is in the form of a casting formed integrally with the head tube 3 and an intake duct 33 open at a front end thereof. A ram intake unit 34 in accordance with the present invention, which is made of a synthetic resin, is coupled with a front end portion of the intake duct 33. This ram intake unit 34 is secured at a rear portion thereof to the head block 2 by means of a plurality of fastening members 80 such as, for example, bolts with the front end opening thereof positioned in alignment with the air intake opening 24 that is defined in the fairing 19 as hereinbefore described. The head block 2 has a rear end portion to which an air cleaner 25 is fluid coupled. Hence, the incoming air A or a wind, then blowing during the travel of the motorcycle relatively in a direction opposite to the direction of travel of the motor, can introduced from the air intake opening 24 through the ram intake unit 34 and then through the intake duct 33 into the air cleaner 25 where the air A so introduced is substantially purified to provide a purified air CA, which is subsequently supplied to the combustion engine E shown in FIG. 1.

Figure 4:
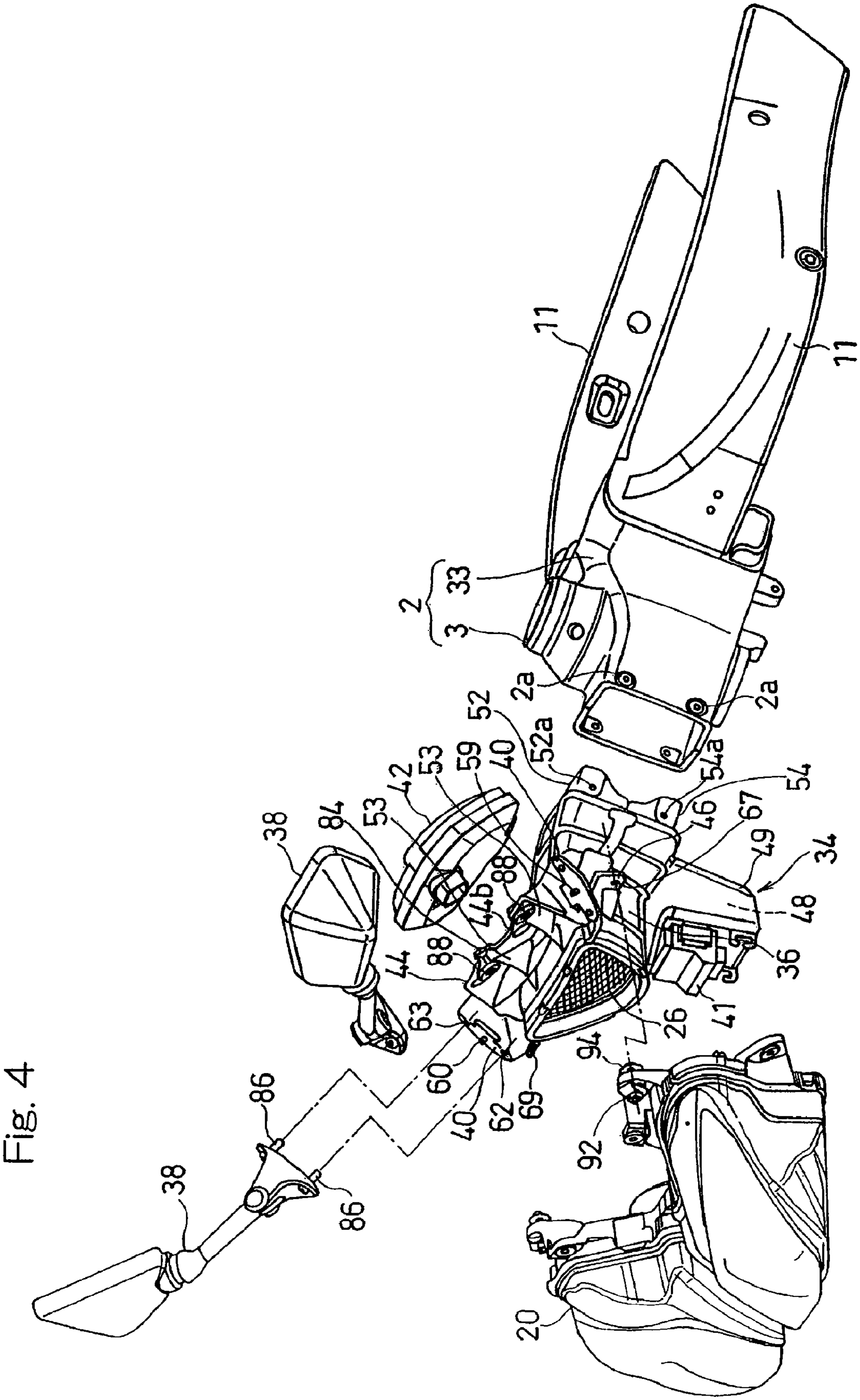
FIG. 4 is an exploded view of the ram intake unit and its peripheral component parts.

FIG. 4 illustrates an exploded view of the ram intake unit 34 and its peripheral components. As shown therein, the ram intake unit 34 is of one piece construction made of a synthetic resin, including a ram air intake duct 36 for sucking air to be introduced into the combustion engine E, a stay 40 employed for each of the side viewing mirrors 38 for supporting the corresponding side viewing mirrors 38, a bracket 44 for supporting a gauge unit or a meter unit 42 comprised of an instrument casing accommodating therein, for example, a speedometer and an engine tachometer, headlamp support pieces 46 to which the headlamp assembly 20 is fitted, and a resonator box 49 defining a resonator chamber 48 in which induction noises can be suppressed. The headlamp assembly 20 referred to above is of a type having, for example, left and right headlamp units and a position lamp all built therein.

Figure 5:
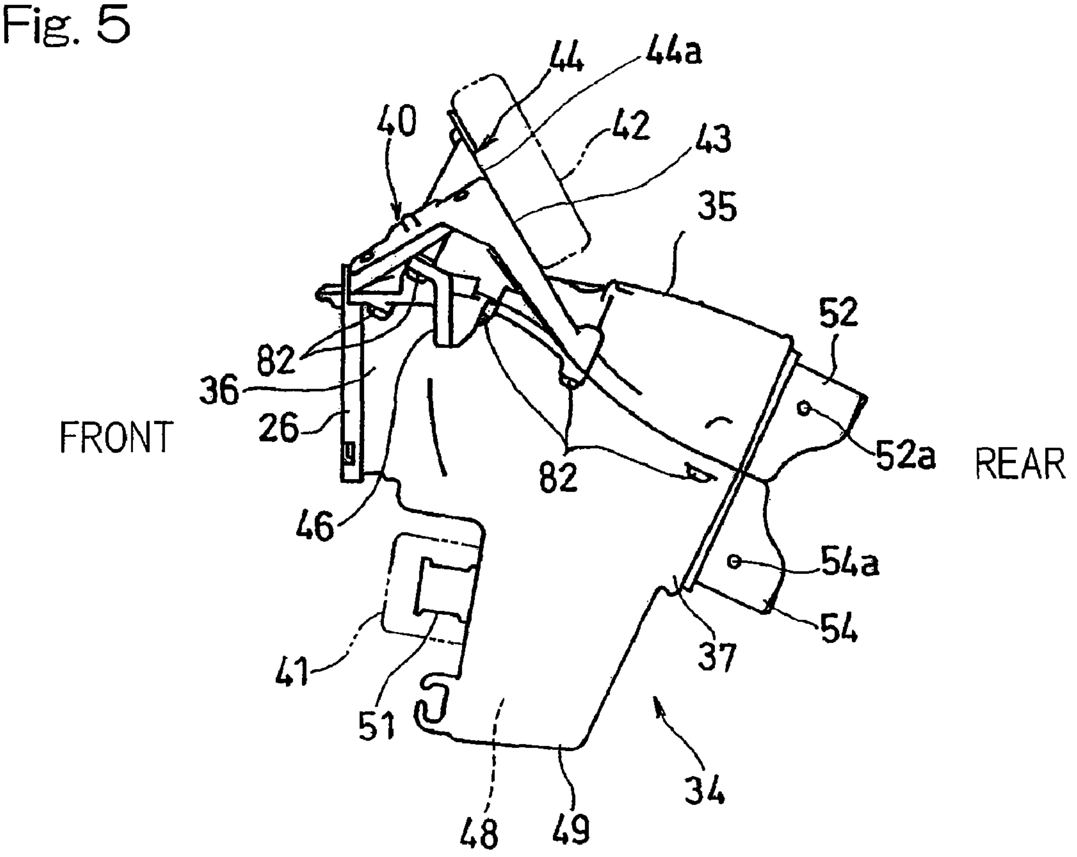
FIG. 5 is a side view of the ram intake unit.

The ram intake unit 34 is schematically shown in a side view in FIG. 5. Referring to FIG. 5, the ram intake unit 34 is of a split molded product made up of upper and lower unit halves 35 and 37. The upper unit half 35 of the ram intake unit 34 is formed with the stay 40 and the bracket 44, both referred to previously whereas the lower unit half 37 of the ram intake unit 34 is formed with the lamp support pieces 46 and the resonator box 49 both similarly referred to previously. The resonator box 49 protrudes downwardly of the lower unit half 37 and has an outer front end face formed integrally with a projection 51 on which an amplifier 41 for an immobilizer is detachably mounted.

In the illustrated embodiment, the upper and lower unit halves 35 and 37 of the ram intake unit 34 are connected together by means of a plurality of, for example, ten, fastening members such as tapping screws 82. The ram air intake duct 36 has its front end to which a screen 26 in the form of a metal net is fitted for avoiding ingress of foreign matter. Also, the upper and lower unit halves 35 and 37 have respective rear ends formed integrally with corresponding tabs 52 and 54, and bolt insertion holes 52*a* and 54*a* for the passage therethrough of the fastening members 80 described hereinbefore and shown in FIG. 3 are defined in those associated tables 52 and 54. The ram intake unit 34 is secured to the head block 2 by means of the fastening members 80 that are fastened firmly after having passed through the respective bolt insertion holes 52*a* and 54*a*.

Figure 6:
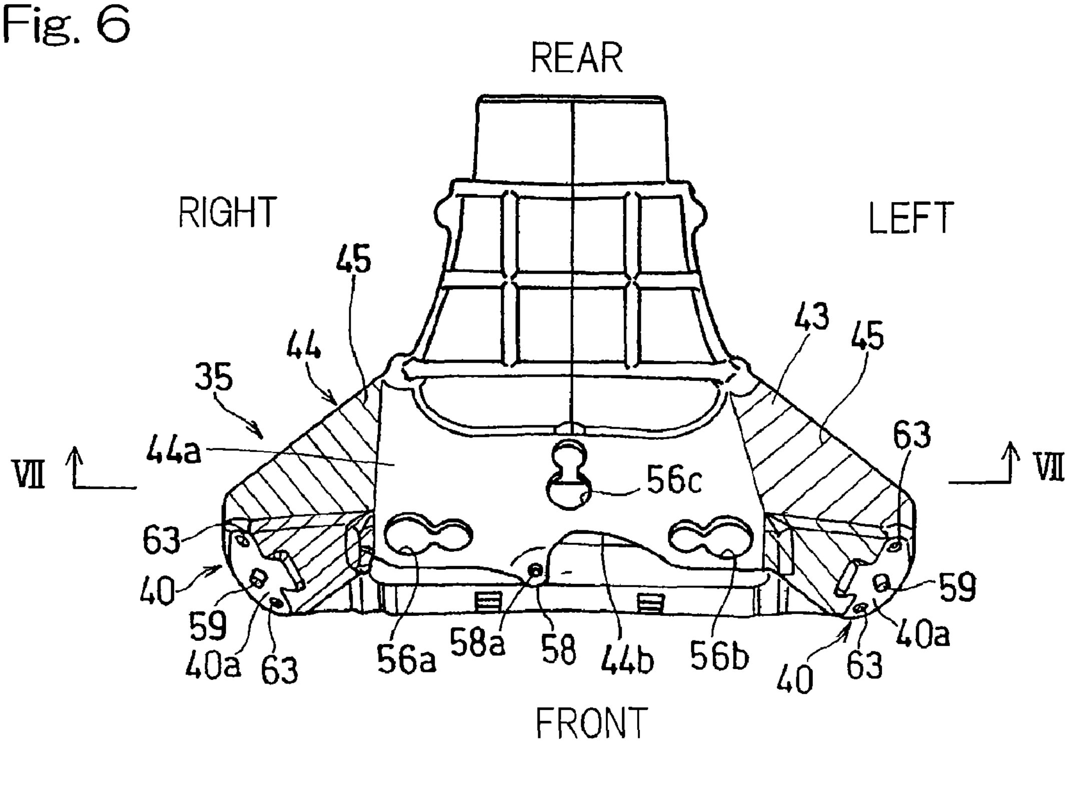
FIG. 6 is a top plan view, with a portion shown in section, showing an upper unit half of the ram intake unit.

The gauge supporting bracket 44 has a gauge mounting surface 44*a* oriented substantially diagonally upwardly towards the eyes of a motorcycle rider then sitting on the rider's seat and the mirror support stay 40 for each of the left and right side viewing mirrors 38 has a respective mirror mounting surface 40*a* oriented substantially diagonally forwards of the motorcycle frame structure 1. As shown in FIG. 6 showing a top plan view of the upper unit half 35 of the ram intake unit 34, the bracket 44 and a rear portion of each of the mirror support stays 40 are connected by a substantially flat continuous wall. In other words, that rear portion of each of the mirror support stays 40 is rearwardly upwardly bulged so that, as best shown in FIG. 7, the gauge mounting surface 44*a* oriented substantially diagonally rearwardly and a stay rear surface 43 continued from each of the mirror mounting surfaces 40*a* oriented substantially diagonally forwards are connected together through a continuous wall 47 to define a continuous surface extending smoothly and continuously therebetween.

Accordingly, the ram intake unit 34 can have an increased volume enough to have a high rigidity and, therefore, the gauge unit 42 shown in FIG. 4 and the left and right side viewing mirrors 38 can be firmly mounted on the gauge mounting surface 44*a* and the mirror mounting surfaces 40*a*, respectively.

In other words, the gauge unit 42 is disposed at an intermediate portion of the motorcycle frame structure 1 with respect to the widthwise direction of the motorcycle and rearwardly thereof (adjacent the motorcycle rider then occupying the rider's seat 17) for better visibility by the motorcycle rider, while the left and right side viewing mirrors 38 are disposed on left and right sides of the motorcycle frame structure 1 and forwardly of the gauge unit 42 with respect to the direction of forward travel of the motorcycle. Accordingly, since the mirror mounting surfaces 40*a* are also positioned laterally of the gauge mounting surface 44*a* with respect to the widthwise direction of the motorcycle and forwardly of the gauge mounting surface 44*a* with respect to the direction of forward travel of the motorcycle, respective rear areas of the mirror mounting surfaces 40*a*, that is, opposite lateral areas of the gauge mounting surface 44*a* are generally apt to be structurally depressed downwardly.

Figure 7:
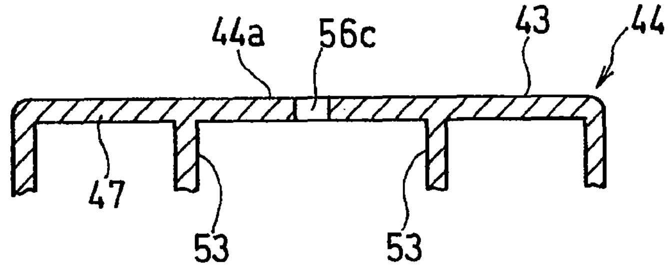
FIG. 7 is a cross-sectional view taken along the line VII-VII in FIG. 6.

However, according to the illustrated embodiment of the present invention, the gauge mounting surface 44*a* positioned at a location intermediate of the width of the motorcycle frame structure 1 as shown in FIG. 7 and the mirror mounting surfaces 40*a* on respective left and right sides thereof, inclusive of the stay rear surfaces 43 at respective rear portions of the mirror mounting surfaces 40*a*, are continued to each other to form a continuous wall without any recess or depression. Accordingly, pads 45 each shown by the hatched area in FIG. 6, are formed to allow the ram intake unit 34 to have an increased volume, which in turn results in increase of the rigidity. As discussed above, the presence of those pads 45 renders the gauge mounting surface 44*a* to represent a generally sector shape when viewed from top. Also, providing a rear surface of the bracket 44, which is oriented forwardly downwardly of the head block 2 as shown in FIG. 4, with reinforcement ribs 53 allows the gauge unit 42 and the side viewing mirrors 38 to be supported further firmly.

The gauge mounting surface 44*a* defined in the bracket 44 is formed with a plurality of gauge mounting holes 56A to 56C. In the embodiment now under discussion, the three gauge mounting holes 56A to 56C are shown as employed, but the number of those gauge mounting holes that can be employed in the practice of the present invention may not be always limited thereto.

The gauge mounting surface 44*a* has a recess 44*b* defined in a front end intermediate portion thereof for the passage therethrough of gauge connecting harnesses and also has a projection 58 formed integrally with the ram intake unit 34 therein in the vicinity of the recess 44*b*. This projection 58 has an insertion hole 58*a* defined therein for the passage therethrough of an elastic member 84 (best shown in FIG. 4) such as, for example, a damper for vibration isolation of the gauge unit 42. The mirror mounting surfaces 40*a* of the left and right mirror support stays 40 are formed with respective positioning projections 59 and respective screw holes 63 engageable with corresponding fastening members 86 such as, for example, bolts (best shown in FIG. 4). Also, the recess 44*b* referred to above can be used not only to accommodate the gauge connecting harnesses, but also to accommodate couplers that are provided in harness terminals or the gauge unit 42.

Figure 8A:
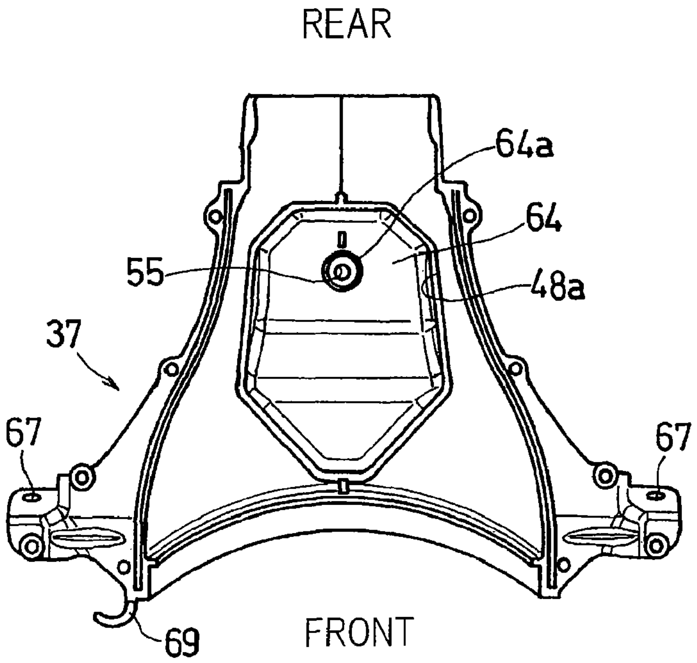
FIG. 8A is a top plan view of a lower unit half of the ram intake unit.
Figure 8B:
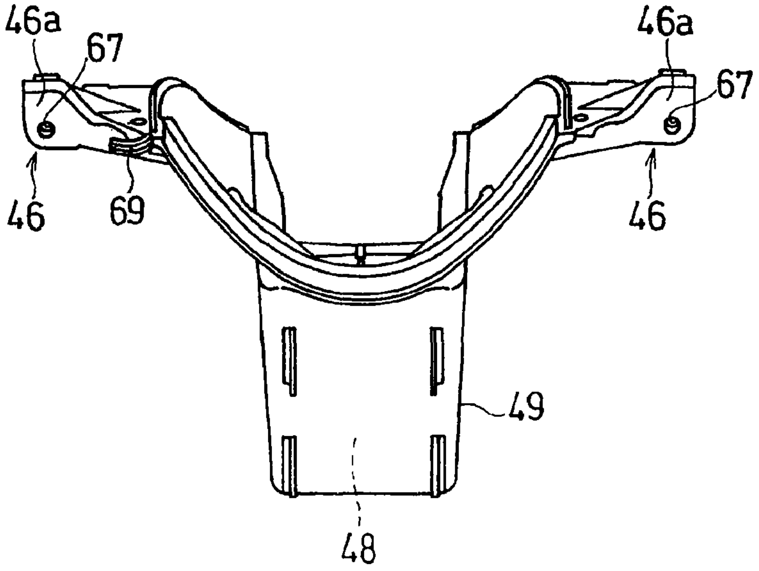
FIG. 8B is a front elevational view showing the lower unit half shown in FIG. 8A.

The lower unit half 37 is best shown in FIG. 8A in a top plan representation and in FIG. 8B in a front elevational representation. The resonator chamber 48 formed integrally with a lower portion of the lower unit half 37 has an opening 48 defined therein, which opening 48 is closed by a separate covering 64 having a connecting tube 64*a* secured thereto. The resonator chamber 48 has a bottom wall formed with a drain hole 55 defined therein. Each of the left and right headlamp support pieces 46 for supporting the headlamp assembly 20 best shown in FIG. 4 has a respective mounting surface 46*a* oriented generally forwards with respect to the direction of forward travel of the motorcycle and has a bolt insertion hole 67 defined therein for supporting the headlamp assembly 20 by means of a screw member engaged therein. It is to be noted that the headlamp assembly 20 and the fairing 19 best shown in FIG. 1 may be concurrently coupled together by the utilization of those bolt insertion holes 67.

The lower unit half 37 has a hook member 69 formed integrally therewith for engagement with a harness (not shown) coupled with the gauge unit 42 (shown in FIG. 4) and positioned on a right side of a front end of the lower unit half 37. It is, however, to be noted that the position where the hook member 69 is formed is not always limited to that shown and described.

Figure 9:
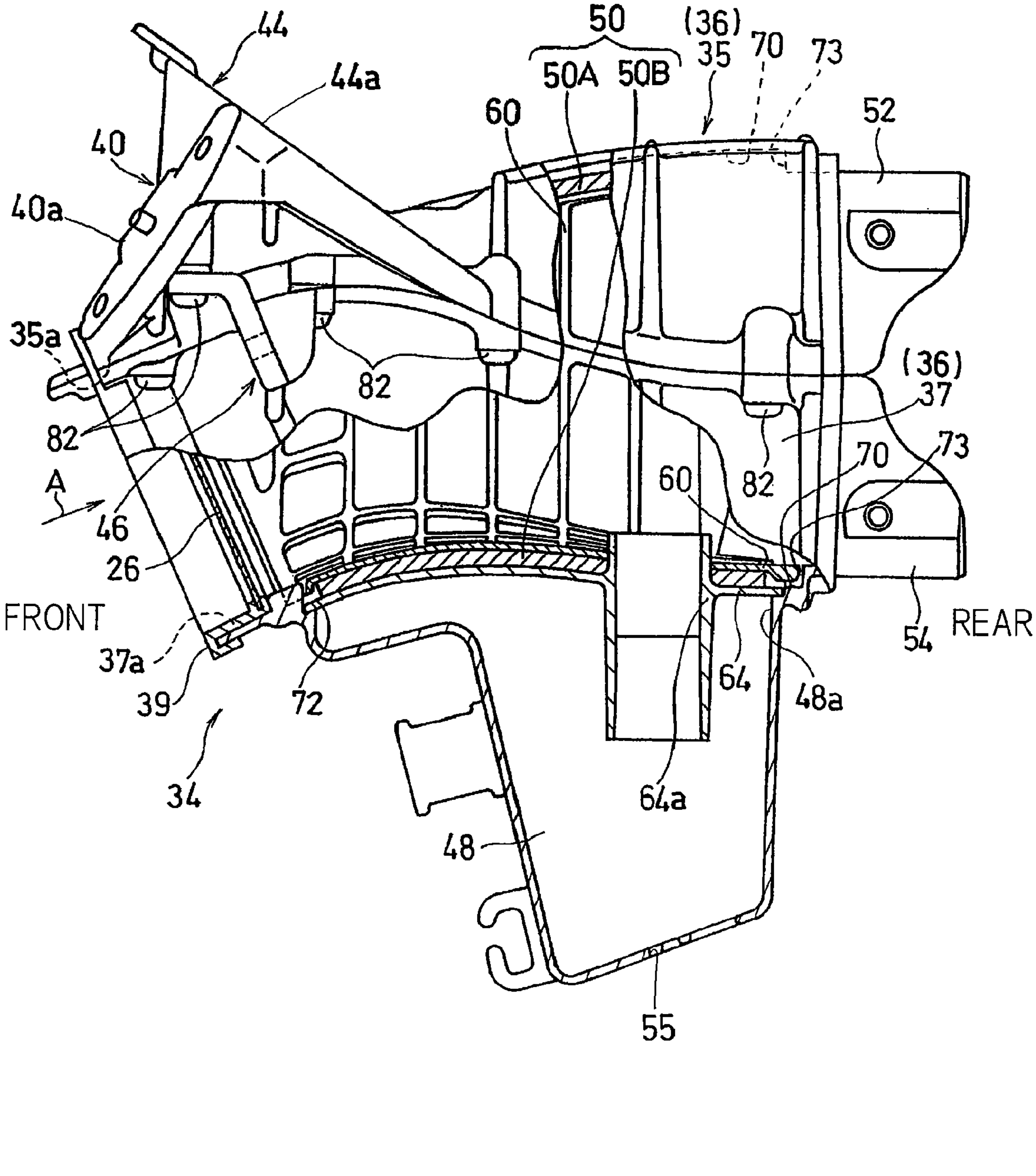
FIG. 9 is a longitudinal sectional view of the ram intake unit.

Referring to FIG. 9 showing a fragmentary longitudinal sectional representation of the ram intake unit 34, the ram intake unit 34 includes an acoustic material or a sound absorbing material 50 for absorbing suction noises and a netted holder 60 for fitting the acoustic material 50 to the ram air intake duct 36. This acoustic material 50 is made of any known flexible material such as, for example, urethane sponge and is arranged inside the ram air intake duct 36, having been bent to follow an inner wall of the ram air intake duct 36. The netted holder 60 is arranged inside the ram air intake duct 36 and positioned inwardly of the acoustic material 50 with respect to the inner wall thereof.

Figure 10:
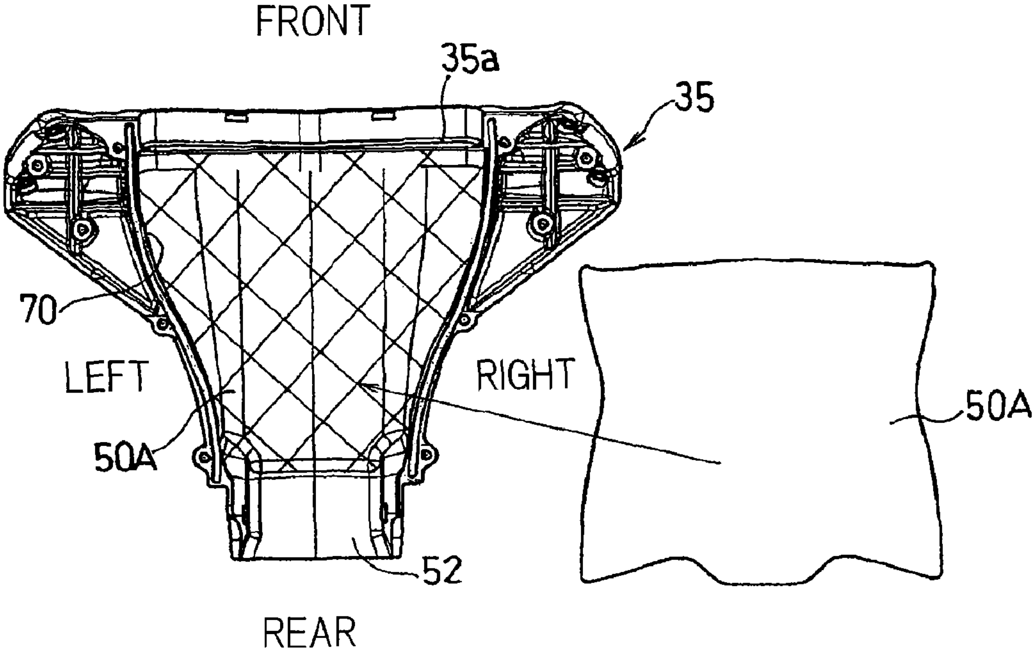
FIG. 10 is a bottom plan view showing the upper unit half of the ram intake unit.

As shown in FIG. 10 showing a bottom plan view of the upper unit half 35, a screen upper support 35*a* for supporting the screen 26 is formed in a front portion of an inner peripheral surface of the upper unit half 35, and an acoustic material 50A that is fitted to the upper unit half 35 is, as shown by the cross hatching in FIG. 10, so arranged as to cover the entire inner peripheral surface of the upper unit half 35 ranging from a rear end of the screen upper support 35*a* to the tab 52.

Figure 11:
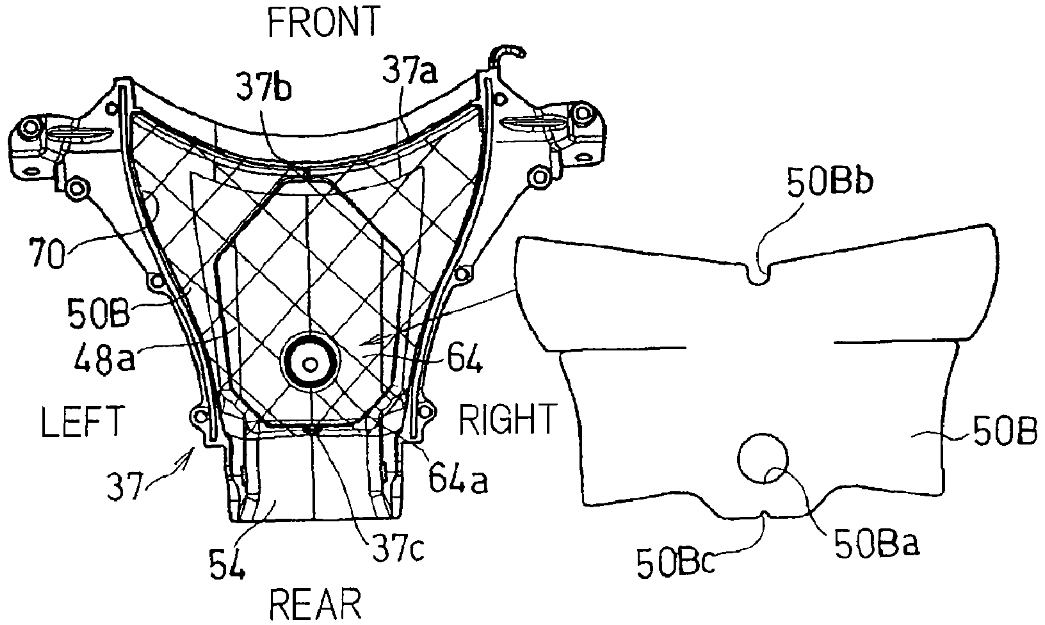
FIG. 11 is a top plan view showing the lower unit half of the ram intake unit.

FIG. 11 illustrates the lower unit half 37 in a top plan representation. A screen lower support 37*a* for supporting the screen 26 is formed in a front portion of an inner peripheral surface of the lower unit half 37, and a front engaging member 37*b* in the form of a projection and used to regulate the position of the holder 60 in a direction circumferentially thereof is formed rearwardly of the screen lower support 37*a* in an intermediate portion of the lower unit half 37 with respect to the width of the motorcycle. A rear engaging member 37*c* in the form of a groove and used to regulate the position of the holder 60 in the circumferential direction is also formed in that intermediate portion of the lower unit half 37 with respect to the width of the motorcycle and immediately forwardly of the tab 54.

An acoustic material 50B that is fitted to the lower unit half 37 is, as shown by the cross hatching in FIG. 11, so arranged as to cover the entire inner peripheral surface of the lower unit half 37 ranging from a rear end of a screen lower support 37*a* in the lower unit half 37 to the tab 54. This acoustic material 50B has formed therein a throughhole 50Ba, through which the connecting tube 64*a* extends, and cutouts 50Bb and 50Bc through which the holder front support 37*b* and the holder rear support 37*c* extend respectively.

As shown in FIG. 9, a recess 70 for accommodating the acoustic material 50B and the holder 60 is defined in an inner surface of the lower unit half 37, and respective positions of the acoustic material 50B and the holder 60 with respect to a direction longitudinally of the motorcycle are regulated by front and rear steps 72 and 73 both formed in longitudinal end portions of the recess 70. This equally applies to the upper unit half 35.

Figure 12:
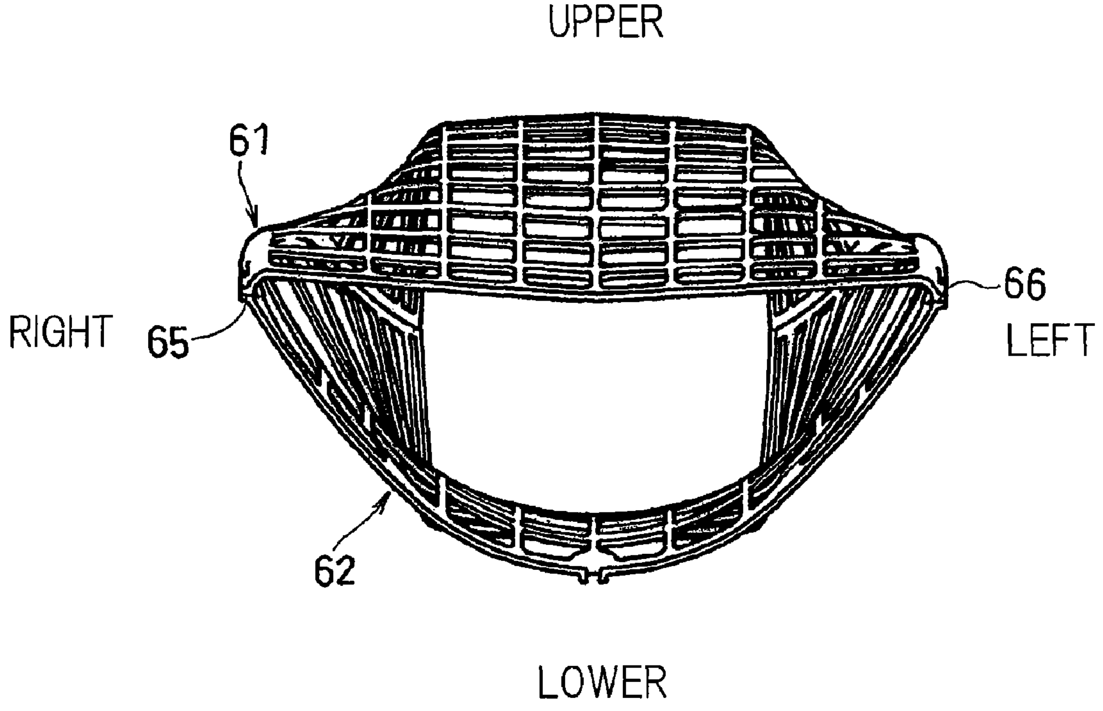
FIG. 12 is a front elevational view of a holder employed for the ram intake unit.
Figure 13:
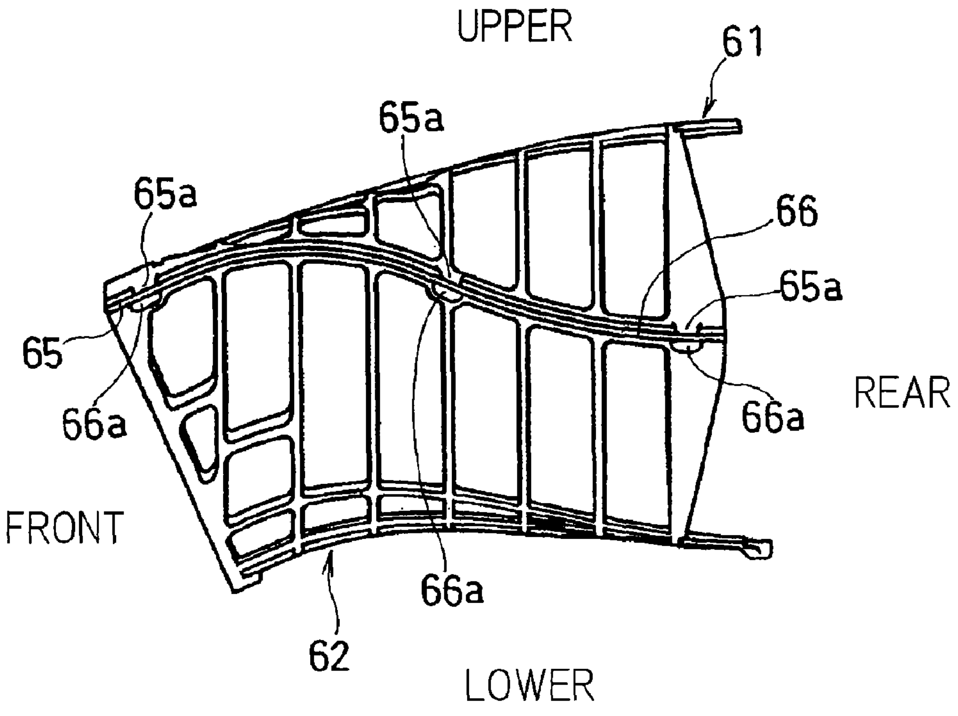
FIG. 13 is a side view of the holder shown in FIG. 12.
Figure 14:
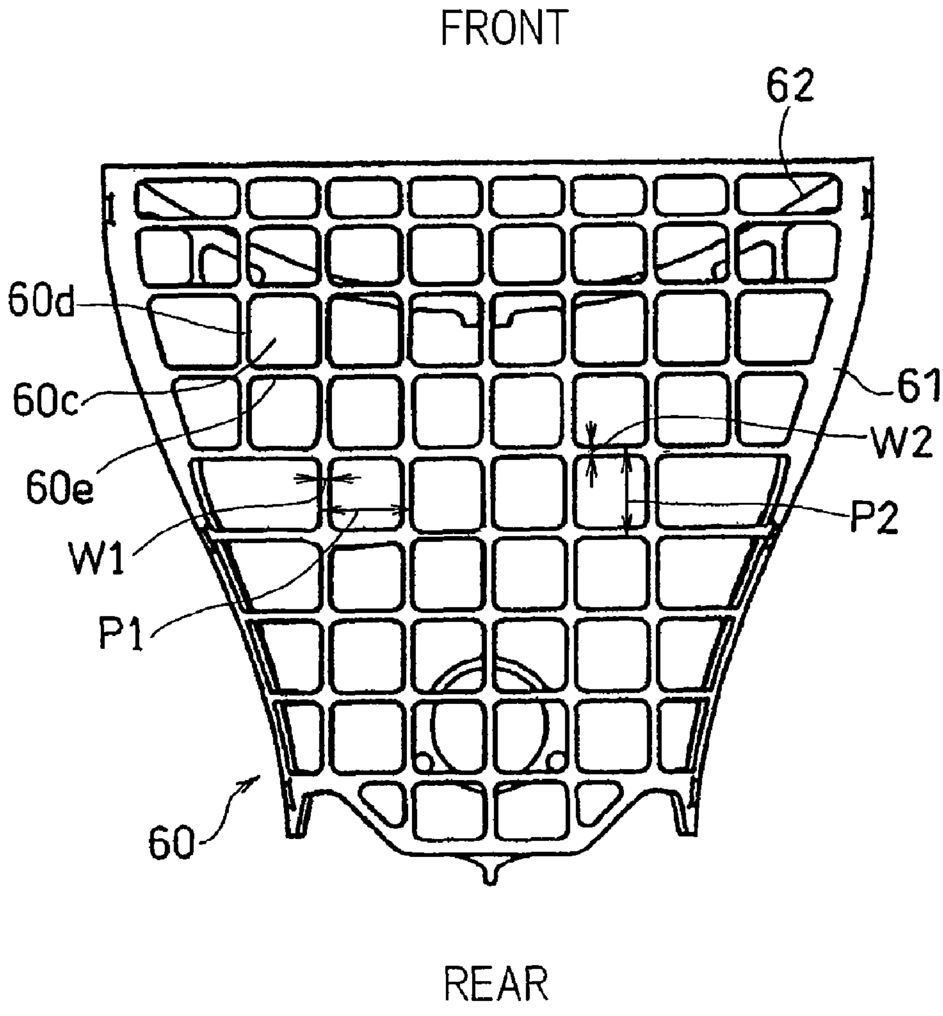
FIG. 14 is a top plan view of the holder.
Figure 15:
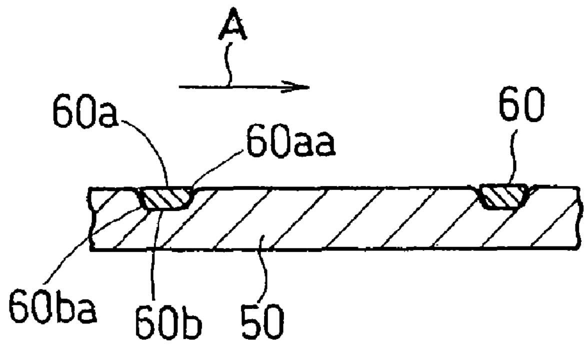
FIG. 15 is a fragmentary sectional view showing an acoustic material fixed by the use of the holder.

The holder 60 referred to previously is shown in FIG. 12 in a front elevational view, in FIG. 13 in a side view and in FIG. 14 in a top plan view. This holder 60 is, as best shown in FIGS. 12 and 13, in the form of a split type resin molded product made up of upper and lower holder halves 61 and 62. Each of the upper and lower holder halves 61 and 62 is formed by the use of a mold having a split face thereof at an inner surface 60*a* of respective holder half 61 or 62 and has therefore opposite end edges 60*aa* of the inner surface 60*a* representing a sharp corner while an outer surface 60*b* has opposite end edges 60*ba* each representing a rounded corner. By so molding the respective holder half 61 or 62, the acoustic material 50 bites or cuts into meshes of the netted holder 60 to allow the inner surface 60*a* of the holder 60 to be flush with an inner surface of the acoustic material 50 so as to be smoothed out as best shown in FIG. 15 and as a result, the air resistance can be reduced. As best shown in FIG. 14, the holder 60 is formed with a multiplicity of the meshes 60*c* each extending completely across the holder 60 so as to open at opposite inner and outer surfaces thereof and, in the instance now under discussion, those meshes 60*c* are delimited by a plurality of elongated longitudinal ribs 60*d* and a plurality of elongated transverse ribs 60*e* that are crossed relative to each other.

Each of the elongated longitudinal ribs 60*d* extending in a longitudinal direction has a width W1 chosen to be within the range of 0.5 to 2.0 mm and preferably within the range of 0.7 to 1.7 mm. The distance P1 between respective intermediate portions of the neighboring longitudinal ribs 60*d* is so chosen as to be within the range of 5 to 15 mm and preferably within the range of 7 to 13 mm, excluding some of those elongated longitudinal ribs that are positioned proximate to longitudinal ends or opposite sides of each of the upper and lower holder halves 61 and 62. On the other hand, each of the elongated transverse ribs 60*e* has a width W2 chosen to be within the range of 0.5 to 2.0 mm and preferably within the range of 0.7 and 1.7 mm. The distance P2 between respective intermediate portions of the neighboring transverse ribs 60*e* is so chosen as to be within the range of 5 to 15 mm and preferably within the range of 7 to 13 mm, excluding some of those elongated transverse ribs that are positioned proximate to the longitudinal ends of each of the upper and lower holder halves 61 and 62.

If the longitudinal and transverse sizes of those meshes 60*c* are so chosen as to fall within the above discussed range, the holder 60 can restrain the acoustic material 50 with sufficient pressing force and strength, and also the meshes 60*c* can have a size sufficient to allow portions of the acoustic material 50 to be exposed therethrough to enable the acoustic material 50 to exhibit a high effect of suppressing the induction noises.

In describing the foregoing embodiment of the present invention, though the holder 60 has been shown and described as made of a synthetic resin, the holder 60 may be made of a metallic material such as, for example, aluminum. In such case, the holder 60 and the screen 26 can be formed integrally with each other. In addition, although the use of the holder 60 of the netted configuration as discussed above is preferred, the holder 60 may have neither mesh nor hole defined therein particularly where the acoustic material 50 is prepared from rubber or the like. Even in this case, hissing sounds transmitting across a peripheral wall of the ram air intake duct 36 can be suppressed, and also the air resistance can be reduced as a result of flatness of the inner surface of the ram air intake duct 36. Yet, in the practice of the present invention, the holder 60 may be of a split type comprised of left and right halves.

As best shown in FIG. 12, the upper holder half 61 and the lower holder half 62 have outer shapes following the inner shapes of the upper unit half 35 and the lower unit half 37, respectively, and, hence, curved to bulge outwardly. Because of those shapes, the holder 60 can stably support the acoustic material 50.

Left and right side rim portions of each of the upper and lower holder halves 61 and 62 is formed with respective mating faces 65 and 66 both extending in a direction generally conforming to the longitudinal sense of the motorcycle. As best shown in FIG. 13, the mating face 65 of the upper holder half 61 is formed with a plurality of downwardly protruding engagement protuberances 65*a*, which have an elasticity and which are, in the illustrated instance, located at a front area, an intermediate area and a rear area of each of the left and right side rim portions of the upper holder half 61. However, position and number of the downwardly protruding engagement protuberances 65*a* are not always limited thereto.

On the other hand, portions of the mating faces 66 of the lower holder half 62 are formed with engagement recesses 66*a* at respective locations alignable respectively with the engagement protuberances 65*a* in the mating faces 65 of the upper holder half 61. It is, however, to be noted that the engagement recesses and the engagement protuberances may be formed in the upper holder half 61 and the lower holder half 62, respectively. With the engagement protuberances 65*a* engaged in the engagement recesses 66*a*, the upper and lower holder halves 61 and 62 are coupled together to provide the holder 60.

Figure 16:
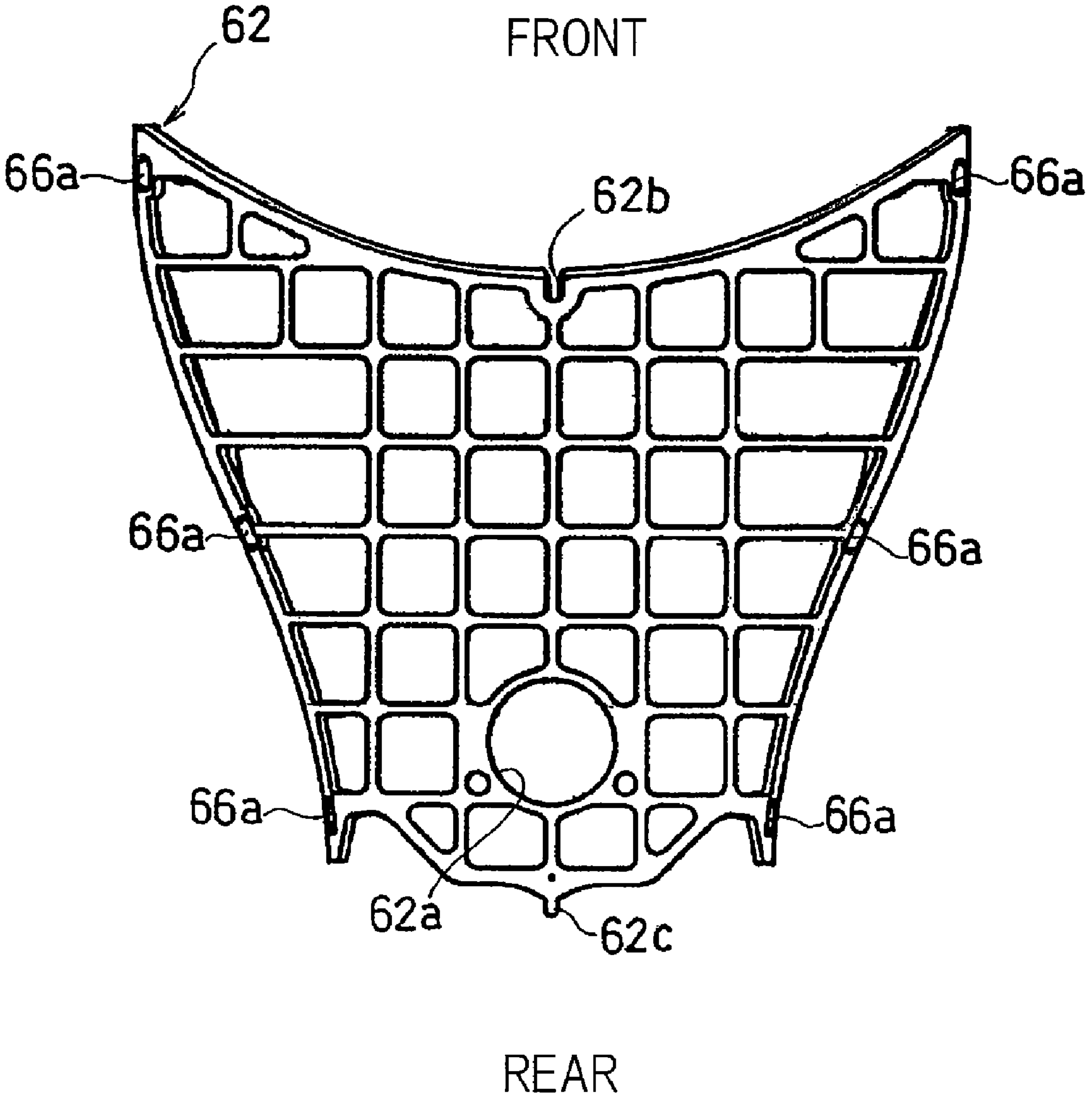
FIG. 16 is a bottom plan view showing the lower holder half of the holder.

FIG. 16 illustrates a bottom plan view of the lower holder half 62. As shown therein, the lower holder half 62 is formed with a throughhole 62*a* defined in a portion thereof adjacent a rear end thereof for the passage therethrough of the connecting tube 64*a* (FIG. 9), a front engagement area 62*b* defined in an intermediate portion of the front end with respect to the width of the motorcycle in the form of a groove engageable with the front engaging member 37*b* (FIG. 11), and a rear engagement area 62*c* defined in such intermediate portion of the rear end in the form of a projection engageable with the rear engaging member 37*c*.

Hereinafter, the manner of assembling the ram intake unit 34 will be described in detail. At the outset, as shown in FIG. 9, the opening 48*a* of the lower unit half 37 has to be closed with the covering 64. Then, the acoustic materials 50A and 50B have to be fitted to the respective inner surfaces of the upper unit half 35 and the lower unit half 37 by means of the lengths of double-sided adhesive tape. Thereafter, the upper and lower holder halves 61 and 62 are coupled together with the engagement projections 65*a* engaged respectively in the engagement recesses 66*a*. It is, however, to be noted that the upper and lower holder halves 61 and 62 may be integrated together by use of a bonding material.

After the holder 60 has been so formed, in a condition in which the holder 60 is positioned in the circumferential direction with the front engagement area 62*b* engaged in the front engaging member 37*b* and with the rear engagement area 62*c* engaged in the rear engaging member 37*c*, the lower holder half 62 is mounted inside the recess 70 in the lower unit half 37, allowing the holder 60 to be thus fitted to the lower unit half 37. In this way, the acoustic material 50B is firmly fixed to the lower unit half 37 while having been sandwiched between the lower holder half 62 and the lower unit half 37.

Thereafter, the upper unit half 35 and the lower unit half 37 are, after having been positioned one above the other, fastened together by means of the tapping screws 82. At this time, the holder 60 is accommodated within the recess 70 defined in the upper unit half 35. Finally, the screen 26 integrated with a rubber packing 39 shown in FIG. 6 is inserted into the ram air intake duct 36. In the embodiment hereinabove described, the acoustic material 50 has been shown and described as fixed in position by means of the lengths of double-sided adhesive tape and the holder 60, but the use of the lengths of double-sided adhesive tape may be dispensed with and the acoustic member 50 may be fixed in position by means of only the holder 60.

After the ram intake unit 34 has been assembled in the manner described above, the gauge unit 42 best shown in FIG. 4 is mounted on the ram intake unit 34. Specifically, the gauge unit 42 is fixedly mounted on the bracket 44 by inserting elastic members 88 such as, for example, grommets into the left and right meter mounting holes 56A and 56B shown in FIG. 6 and then threadingly inserting fastening members (not shown) into corresponding internally threaded holes (also not shown), which are defined in the gauge unit 42, past the associated elastic members 68. With the elastic members 88 and 84 engaged in the remaining gauge mounting hole 56C and the insertion hole 58*a*, the gauge unit 42 has its rear surface urged against the gauge mounting surface 44*a* to thereby allow the gauge unit 42 to be prevented from swaying. The harnesses to be connected with the gauge unit 42 are connected with the gauge unit 42 through the recess 44*b*.

Referring to FIG. 4, each of the side viewing mirrors 38 is fixed in position with the positioning projection 59 of the corresponding stay 40 engaged in an associated engagement hole defined in the side viewing mirror 38, followed by fastening the corresponding fastening member 86 into the screw hole 63.

The headlamp assembly 20 is fitted to the ram intake unit 34 by inserting the fastening members 94 such as, for example, bolts into mounting hole (not shown) in the headlamp assembly 20 and the bolt insertion holes 67 in the headlamp support pieces 46, followed by threading respective clamp nuts 92 for the headlamp assembly 20. Where the headlamp assembly 20 and the fairing 19 are to be concurrently fastened to the ram intake unit 34, the fastening members 94 such as, for example, bolts have to be inserted into the bolt insertion holes 67 in the ram intake unit 34 and the mounting hole (not shown) in the headlamp assembly 20, followed by fastening clamp nuts provided in the fairing 19. In the illustrated embodiment, the headlamp assembly 20 has its upper portion supported by the headlamp support pieces 46 and its lower portion supported by the fairing 19 by means of extra support means.

The ram intake unit 34 of the structure hereinbefore described is fitted to the head block 2 with the fastening members 80 (shown in FIG. 3) threadingly engaged into the bolt insertion holes 52*a* and 54*a* thereof and the screw holes 2*a* in the head block 2.

With the present invention having been fully described hereinbefore, it will readily understood that the following numerous effects can be obtained.

Specifically, since the acoustic material 50 is fixed in position having been sandwiched between the holder 60 and the ram air intake duct 36, the acoustic material 50 does not drop out even when exposed to the strong incoming wind and as a result, can provide a sound absorbing effect for a prolonged period of time. Also, since bonding by means of the lengths of double-sided adhesive tape is also concurrently used, the possibility of the acoustic material 50 being separated from the ram air intake duct 36 can be further effectively avoided. In addition, since the holder 60 is of a netted configuration, the incoming wind effectively contacts those portions of the acoustic material 50 exposed through the meshes and, therefore, a high sound absorbing effect can be maintained.

The acoustic material 50 and the holder 60 are accommodated within the recess 70 defined in the inner surface of the ram air intake duct 36 so that the position thereof along a longitudinal axis of the motorcycle can be regulated and, on the other hand, the front and rear engaging members 37*b* and 37*c* provided in the ram air intake duct 36 are engaged respectively with the front and rear engagement areas 62*b* and 62*c* provided in the holder 60, allowing the holder 60 to be regulated in position relative to the ram air intake duct 36 in the direction circumferentially thereof. Therefore, with a simplified structure, the positioning of the holder 60 relative to the ram air intake duct 36 can be accomplished easily.

Since the acoustic material 50 is prepared from urethane sponge, the holder 60 is easy to bite into the flexible urethane sponge to smoothen the inner surface of the holder 60 and as a result, the air resistance can be reduced advantageously. In particular, in the case of the holder 60 being in the form of a net, biting into the flexible urethane sponge takes place easily.

Also, since each of the holder 60 and the ram air intake duct 36 is of a split type molded products comprised of upper and lower mold segments, each of the holder 60 and the ram air intake duct 36 both having a complicated shape can be easily formed by the use of a die forming technique.

Also, since the ram air intake duct 36, the stays 40 for the support of the respective side viewing mirrors 38 and the bracket 44 for the support of the gauge unit 42 are formed integrally, the number of component parts used in the ram intake unit 34 of the present invention can be reduced, allowing the number of assembling steps to be reduced accordingly. Considering that they are formed integrally from the synthetic resin, the weight can be reduced owing to the use of the synthetic resin while the rigidity of the entirety can be increased to secure a required strength to thereby enhance the sound absorbing effect brought about by the increase of the rigidity.

Moreover, since the gauge mounting surface 44*a* oriented diagonally rearwardly and the mirror mounting surfaces 40*a* oriented diagonally forwardly are connected together by means of the substantially flat and continuous wall 47, no recess is formed rearwardly of the mirror mounting surfaces 40*a* enough to increase the volume of the ram intake unit 34 and, therefore, the rigidity of the ram intake unit 34 is increased to allow the gauge unit 42 and the side viewing mirrors 38 to be supported firmly. Also since the reinforcement ribs 53 are provided in the rear surface of the bracket 44, the gauge unit 42 and the side viewing mirrors 38 can further firmly be supported.

Furthermore, since the headlamp support pieces 46 for supporting the headlamp assembly 20 and the hook 69 for fixing the harnesses (not shown) that are connected with the gauge unit 42 are also formed integrally, the number of component parts used and the number of assembling steps can be further reduced advantageously.

Yet, since the resonator chamber 48 in which the induction sounds can be reduced is formed integrally, the number of component parts used and the number of assembling steps can be reduced, and also the capacity of the resonator chamber 48 can be brought in by the effective utilization of a space below the ram intake unit 34. In addition, fitting the amplifier 41 for the immobilizer to the resonator chamber 48 makes it possible to effectively utilize a space below the ram intake unit 34.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention.

Accordingly, such changes and modifications are, unless they depart from the scope of the present invention as delivered from the claims annexed hereto, to be construed as included therein.

What is claimed is:

1. A ram intake unit mounted on a front portion of a frame structure of a motorcycle, comprising:
- an acoustic material disposed along an inner wall of a ram air intake duct, forming an induction system for a motorcycle combustion engine, for absorbing induction noises; and
- a holder for securing the acoustic material to the ram air intake duct, the holder being of a netted configuration and disposed inwardly of the acoustic material,
- in which the acoustic material bites or cuts into meshes of the netted holder to allow an inner surface of the holder to be flush with an inner surface of the acoustic material to provide a combined smoothed continuous inner surface.

2. The ram intake unit as claimed in claim 1, in which the acoustic material and the holder are accommodated within a recess defined in an inner surface of the ram air intake duct and are then regulated in their position in a direction longitudinally thereof.

3. The ram intake unit as claimed in claim 1, in which an engagement member provided in the ram air intake duct is engaged with an engagement area, provided in the holder, to thereby regulate the position of the holder relative to the ram air intake duct in a direction circumferentially thereof.

4. The ram intake unit as claimed in claim 1, in which the acoustic material is made of an urethane sponge.

5. The ram intake unit as claimed in claim 1, in which the holder is of a split type molded products comprised of upper and lower mold segments.

6. The ram intake unit as claimed in claim 1, in which the ram air intake duct is of a split type molded products comprised of upper and lower mold segments.

7. The ram intake unit as claimed in claim 6, in which each of the acoustic material and the holder includes two parts fitted to the respective mold segments of the ram intake unit.

8. The ram intake unit as claimed in claim 1, further comprising a stay for supporting a side viewing mirror and a bracket for supporting a gauge unit, and in which the ram air intake duct, the stay and the bracket are integrally formed by a synthetic resin molding.

9. The ram intake unit as claimed in claim 8 further comprising a headlamp support molded integrally for supporting a headlamp assembly.

10. The ram intake unit as claimed in claim 8, further comprising a resonator chamber formed integrally for reducing induction noises.

11. The ram intake unit as claimed in claim 1, in which the acoustic material is made of a flexible material and firmly fixed to the ram air intake duct while having been sandwiched between the holder and the ram air intake duct.

12. A ram intake unit mounted on a front portion of a frame structure of a motorcycle, the ram intake unit comprising:
- an acoustic material disposed along an inner wall of a ram air intake duct, forming an induction system for a motorcycle combustion engine, for absorbing induction noises;
- a holder for securing the acoustic material to the ram air intake duct;
- a stay for supporting a side viewing mirror; and
- a bracket for supporting a gauge unit,
- in which the ram air intake duct, the stay and the bracket are integrally formed by a synthetic resin molding,
- in which the bracket has a gauge mounting surface oriented diagonally rearwardly and the stay has a mirror mounting surface positioned laterally of the meter mounting surface and oriented diagonally forwards and in which a region ranging from the gauge mounting surface of the bracket to the mirror mounting surface of the stay is connected by a flat and continuous wall.

13. The ram intake unit as claimed in claim 12, in which the gauge mounting surface of the bracket represents a sector shape when viewed from top.

14. A ram intake unit mounted on a front portion of a frame structure of a motorcycle, the ram intake unit comprising:
- an acoustic material disposed along an inner wall of a ram air intake duct, forming an induction system for a motorcycle combustion engine, for absorbing induction noises;
- a holder for securing the acoustic material to the ram air intake duct;
- a stay for supporting a side viewing mirror; and
- a bracket for supporting a gauge unit,
- in which the ram air intake duct, the stay and the bracket are integrally formed by a synthetic resin molding,
- in which the bracket has a rear surface provided with reinforcement rib.

15. A ram intake unit mounted on a front portion of a frame structure of a motorcycle, the ram intake unit comprising:
- an acoustic material disposed along an inner wall of a ram air intake duct, forming an induction system for a motorcycle combustion engine, for absorbing induction noises;

a holder for securing the acoustic material to the ram air intake duct;

a stay for supporting a side viewing mirror;

a bracket for supporting a gauge unit, and a hook for securing a harness to be connected with the gauge, in which the ram air intake duct, the stay, the bracket and the hook are integrally formed by a synthetic resin molding.

16. A ram intake mounted on a front portion of a frame structure of a motorcycle, comprising:

an acoustic material disposed along an inner wall of a ram air intake duct, forming an induction system for a motorcycle combustion engine, for absorbing induction noises; and a holder for securing the acoustic material to the ram air intake duct, the holder being of a netted configuration and disposed inwardly of the acoustic material, in which the acoustic material bites or cuts into meshes of the netted holder to allow an inner surface of the holder to be flush with an inner surface of the acoustic material to provide a combined smoothed continuous inner surface, wherein the meshes of the holder are delimited by a plurality of ribs each having inner and outer surfaces, the inner surface having opposite end edges each representing a sharp corner and the outer surface having opposite end edges, each representing a rounded corner.

* * * * *